(12) United States Patent
Carl

(10) Patent No.: US 10,592,106 B2
(45) Date of Patent: Mar. 17, 2020

(54) REPLICATION TARGET SERVICE

(71) Applicant: Amazon Technologies, Inc., Reno, NV (US)

(72) Inventor: Craig Keith Carl, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/856,279

(22) Filed: Apr. 3, 2013

(65) Prior Publication Data

US 2014/0289463 A1  Sep. 25, 2014

Related U.S. Application Data

(60) Provisional application No. 61/803,764, filed on Mar. 20, 2013.

(51) Int. Cl.
| G06F 12/00 | (2006.01) |
| G06F 3/06 | (2006.01) |
| G06F 12/02 | (2006.01) |
| G06F 13/00 | (2006.01) |
| G06F 13/28 | (2006.01) |

(52) U.S. Cl.
CPC .......... *G06F 3/0604* (2013.01); *G06F 3/067* (2013.01); *G06F 3/0661* (2013.01); *G06F 12/02* (2013.01); *G06F 3/0659* (2013.01)

(58) Field of Classification Search
CPC ...... G06F 3/0604; G06F 3/0659; G06F 3/067; G06F 12/02
USPC ...... 711/6, 114, 202; 707/705, 821
See application file for complete search history.

(56) References Cited

U.S. PATENT DOCUMENTS

| 8,352,941 | B1* | 1/2013 | Protopopov et al. ............. 718/1 |
| 8,417,871 | B1* | 4/2013 | de la Iglesia ....... G06F 11/2094 |
| | | | 711/114 |
| 2006/0116989 | A1 | 6/2006 | Bellamkonda et al. |
| 2006/0248047 | A1* | 11/2006 | Grier et al. ...................... 707/2 |
| 2009/0282090 | A1* | 11/2009 | Hamilton et al. ............ 707/204 |
| 2009/0300023 | A1* | 12/2009 | Vaghani .......................... 707/10 |

(Continued)

FOREIGN PATENT DOCUMENTS

| CN | 1411642 A | 4/2003 |
| CN | 1604568 A | 4/2005 |

(Continued)

OTHER PUBLICATIONS

International Search Report and Written Opinion dated Sep. 5, 2014, International Patent Application No. PCT/US2014/031325, filed Mar. 20, 2014.

(Continued)

*Primary Examiner* — Mark A Giardino, Jr.
(74) *Attorney, Agent, or Firm* — Davis Wright Tremaine LLP

(57) ABSTRACT

A data storage service receives commands configured according to a communication protocol, such as a small computer system interface protocol. The commands may be replications of commands sent to a block-level data storage system, such as a storage area network. Data to be written by execution of the commands is persisted using an object-based data storage system. When read commands are received, data blocks can be extracted from the data objects in which they are stored.

25 Claims, 10 Drawing Sheets

(56) References Cited

U.S. PATENT DOCUMENTS

| | | | |
|---|---|---|---|
| 2010/0169391 A1 | 7/2010 | Baptist et al. | |
| 2011/0138131 A1 | 6/2011 | Regni et al. | |
| 2011/0161293 A1* | 6/2011 | Vermeulen | G06F 17/30212 |
| | | | 707/626 |
| 2011/0185135 A1* | 7/2011 | Fujii | G06F 3/0605 |
| | | | 711/162 |
| 2012/0233668 A1 | 9/2012 | Leafe et al. | |
| 2012/0254193 A1 | 10/2012 | Chattopadhyay et al. | |
| 2013/0275656 A1* | 10/2013 | Talagala | G06F 12/0246 |
| | | | 711/103 |
| 2013/0275693 A1* | 10/2013 | Bello | G06F 3/0623 |
| | | | 711/160 |
| 2013/0346366 A1* | 12/2013 | Ananthanarayanan | |
| | | | G06F 16/273 |
| | | | 707/611 |
| 2014/0149355 A1* | 5/2014 | Gupta | G06F 11/1446 |
| | | | 707/652 |

FOREIGN PATENT DOCUMENTS

| | | |
|---|---|---|
| JP | 2008287675 A | 11/2008 |
| JP | 2009116809 A | 5/2009 |
| JP | 2009522659 A | 6/2009 |

OTHER PUBLICATIONS

"Notice on Grant of Patent Right and Proceeding with the Registration Formalities, dated Nov. 17, 2017," Chinese Patent Application No. 201480017153.5, filed Mar. 20, 2014, 2 pages.

Japanese Notice for Revocation of Reconsideration dated Apr. 3, 2018, Patent Application No. 2016-504361, filed Mar. 20, 2014, 2 pages.

Japanese Notice of Rejection dated Nov. 13, 2018, Patent Application No. 2016-504361, filed Mar. 20, 2014, 6 pages.

Canadian Office Action dated Jun. 11, 2018, Patent Application No. 2,907,424, filed Mar. 20, 2014, 4 pages.

European Communication pursuant to Article 94(3) EPC dated Aug. 27, 2018, Patent Application No. 14768648.9, filed Mar. 20, 2014, 8 pages.

Japanese Appeal Decision dated May 7, 2019, Patent Application No. 2016-504361, filed Mar. 20, 2014, 19 pages.

Canadian Office Action dated Nov. 5, 2019, Patent Application No. 2,907,424, filed Mar. 20, 2014, 3 pages.

Indian First Examination Report dated Jan. 15, 2020, Patent Application No. 9681/DELNP/2015, filed Mar. 20, 2014, 4 pages.

* cited by examiner

REPLICATION TARGET SERVICE

CROSS-REFERENCE TO RELATED APPLICATIONS

This application claims priority from U.S. provisional application No. 61/803,764, filed on Mar. 20, 2013, entitled "Replication Target Service," the content of which is incorporated by reference herein in its entirety.

BACKGROUND

Data storage systems have evolved and continue to evolve to keep up with the demands of organizations that use them. Many organizations, for example, utilize storage area networks (SANs) for, among other reasons, the purpose of performance, redundancy, flexibility and simplicity in a computing environment. Despite their many advantages, modern data storage systems can present many challenges for an organization. For example, data storage systems often include components that are configured for high performance, and such performance often comes at a cost. Consequently, data storage systems often require a substantial capital investment. In addition, many data storage systems utilize specialized equipment that operate according to proprietary protocols. Moving data from data storage system to another can present significant challenges, often requiring the use of expensive equipment able to communicate using such proprietary protocols. As a result, organizations using various data storage systems can find themselves in situations where even more capital investment is needed.

BRIEF DESCRIPTION OF THE DRAWINGS

Various embodiments in accordance with the present disclosure will be described with reference to the drawings, in which.

DETAILED DESCRIPTION

Figure 1:
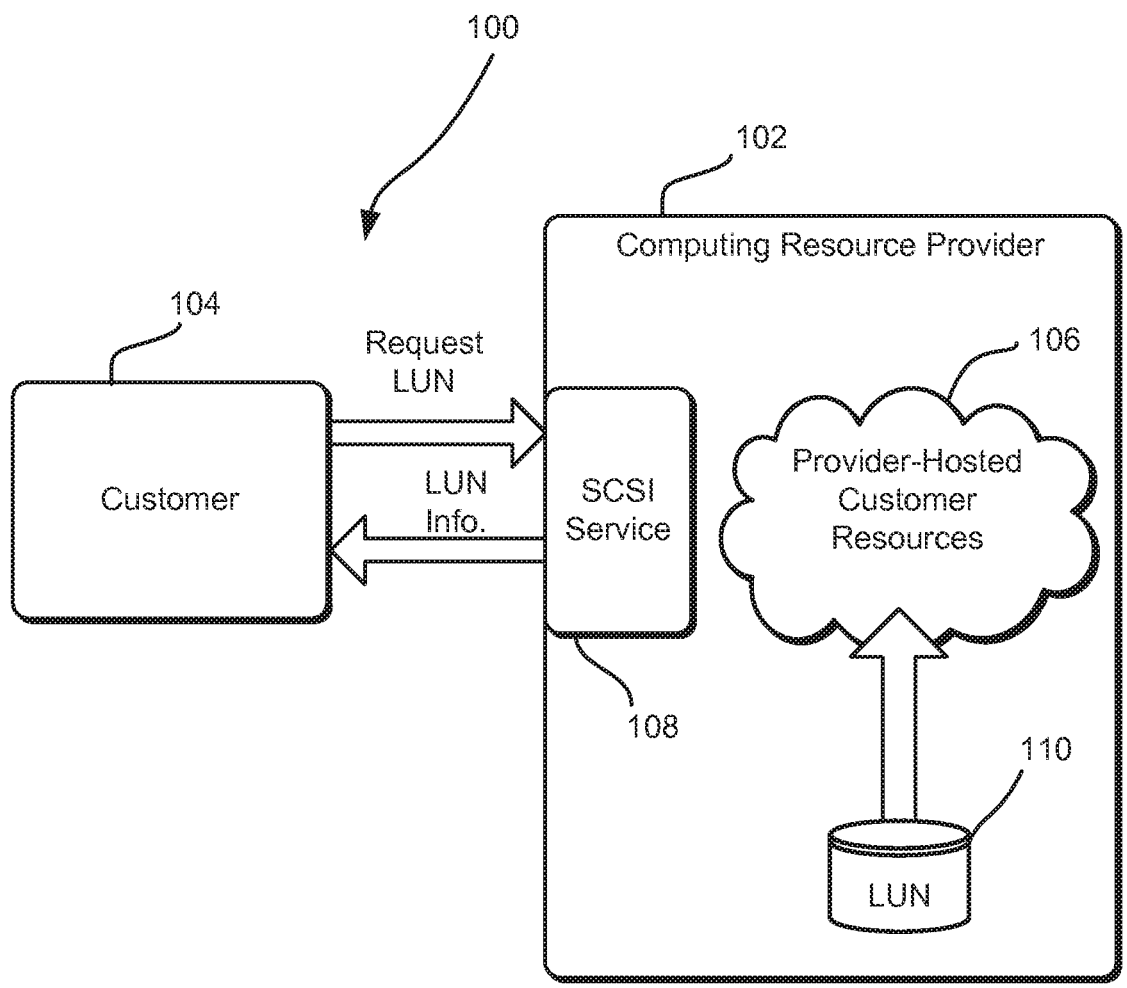
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested relate to providing a service for providing a remote (target) for data replication. In an embodiment, an entity (e.g., an organization) is able to contact the service, such as through appropriately configured application programming interface (API) calls to the service, to request provisioning of a virtual device that supports read and write operations. In an embodiment, the entity is a customer of a computing resource provider that operates the service. Upon receipt of the request, the service may provision the requested device and provide an identifier for the device. The device may be, for example, a virtual data storage device configured to operate in accordance with a small computer system interface (SCSI) protocol, such as SCSI-3. The identifier for the device may be a logical unit number (LUN) that uniquely identifies the device for the entity. As discussed below, the entity may replicate commands (e.g., SCSI commands) to the provisioned virtual device to cause the data to be persisted accordingly.

In an embodiment, the entity uses a data storage system, such as a storage area network (SAN). Hosts (e.g., servers or other computing devices) of the entity that utilize the data storage system are able to issue commands to the data storage system to cause the data storage system to perform respective operations. For certain operations, such as write operations, corresponding commands are transmitted to both the data storage system and to a remote endpoint corresponding to the provisioned device. For example, when a write command is issued to the data storage system, the same command is transmitted to the service that provisioned the device so that the write command is executed both at the data storage system and remotely for the virtual device.

In some examples, hosts communicate with the data storage system according to a non-proprietary protocol, such SCSI-3. Commands of the non-proprietary protocol may be embedded to enable transport of the commands over various media. For instance, hosts may communicate with the data storage system using the SCSI over Internet Protocol small computer system interface (iSCSI) protocol or the fiber channel protocol (FCP). For certain types of commands, the non-proprietary protocol is used to replicate the commands by sending the commands over a network, such as the Internet, to a remote endpoint, as discussed above. The commands of the non-proprietary protocol may be encapsulated using another protocol to enable their transfer over the network.

As noted above, the remote endpoint corresponds to an interface of a service that receives the replicated commands of the non-proprietary protocol and persists data accordingly. For example, the service may receive the same SCSI command that was issued to a SAN. The service may persist data according to the command, thereby creating a replica of data written to the SAN. In some examples, the service interacts with a data storage service to persistently and durably persist data for the provisioned device. In other examples, the service maintains its own data store (e.g., a key-value store where data is accessible using a key for the data).

In various embodiments, a data storage system to which commands are sent (and replicated to the service) is a block data storage system that operates on a block level, utilizing uniform blocks of data of a predetermined size, such as 512 bytes. Commands issued to the data storage system may be configured on a block level such as by specifying one or more blocks to which the command applies. A data storage service used to persist data in connection with replicated commands may operate in a different manner. For example, the data storage service may be object-based, enabling the storage of data objects that are not necessarily of uniform size. The object-based data storage system may store data objects as an abstraction of underlying block data storage devices. In some examples, the data storage service operates as a key-value store where each data object has a corresponding key used to locate the data object in the data storage system. Data corresponding to replicated commands may be stored on an object level using the data storage service. Write commands issued to a data storage system on a block level may be translated to commands issued to the data storage service on an object level. For example, SCSI commands may be used to appropriately configure API calls to the data storage service. In some embodiments, translation of the commands is asynchronous. For instance, write commands may be written to a buffer (i.e., data to be stored as a result of execution of the write commands may be stored in a buffer). Data in the buffer may be collected into a single data object, for example, when an expiration time of the buffer expires or the amount of data in the buffer reaches a threshold, which may be predetermined.

In this manner, data in a data storage system, such as a SAN, can be replicated durably and persistently without the need for significant additional capital investment. In addition, the techniques described and suggested herein facilitate additional technical advantages. For example, because, in some embodiments, the service to which commands are replicated is able to process SCSI commands from multiple devices, which are not necessarily hosted in a single location. In one example, the service is used to support a model where one device is able to write to a virtual device provided by the service and multiple devices are able to read the data from the virtual device. As another example, the data persisted by the service can be used to provision additional data storage volumes for use by other computer systems. In some examples, a computing resource provider can provision virtual block storage devices that can be logically mounted to virtual computer systems of a virtual computer system service. Additional uses are also enabled by the various techniques described herein.

FIG. 1 shows an illustrative example of an environment 100 in which various embodiments may be practiced. In the environment 100, a computing resource provider 102 provides various computing resource services to customers of the computing resource provider. The computing resource provider 102 may be an organization that hosts various computing resources on behalf of one or more customers. For example, a computing resource provider may operate one or more facilities that are used to host various computing hardware resources, such as hardware servers, data storage devices, network devices, other devices discussed herein and other equipment, such as server racks, networking cables and the like. The computing resource hardware may utilize its computing hardware resources to operate one or more services. Such services may include services that enable customers of the computing resource provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

Accordingly, as illustrated in FIG. 1, the environment 100 includes a customer 104. The customer 104 of the computing resource provider 102 may utilize various services provided by the computing resource provider 102. Accordingly, the customer 104 may have various computing resources hosted by the computing resource provider. As illustrated in FIG. 1, the customer 104 has provider-hosted customer resources 106 hosted by the computing resource provider 102. The provider-hosted customer resources 106 may, but do not necessarily, include one or more virtual computer systems, one or more data storage devices, one or more network appliances and/or other computing resources. In an embodiment, the computing resource provider 102 provides a SCSI service 108.

The SCSI service 108 may include one or more computing resources collectively configured to provide SCSI endpoints for use by customers of the computing resource provider, where a SCSI endpoint is a logical device to which SCSI commands may be transmitted and processed accordingly. Thus, for example, the customer 104 may utilize the SCSI service 108 to perform various operations in connection with a SCSI end point hosted by the computing resource provider 102. The customer, in some examples, may issue commands to the SCSI service 108 in utilizing the SCSI protocol where the commands may include commands such as read commands, write commands, and/or other commands.

The commands issued from the customer 104 to the computing resource provider 102 may be encapsulated utilizing a protocol by which the customer 104 communicates with the computing resource provider 102. For example, SCSI commands may be issued from the customer 104 to the SCSI service 108 of the computing resource provider 102 utilizing the iSCSI protocol. In accordance with various embodiments of the present disclosure, the customer 104, through one or more devices, is able to interact with the SCSI service 108 to request that the computing resource provider 102 add a logical unit identified by a logical unit number (LUN) to the provider hosted customer resources 106. The logical unit may be a device (e.g., virtual device), a device addressed by the SCSI protocol or another protocol that encapsulate SCSI protocol. It should be noted that the terms "logical unit" and "LUN" are used interchangeably and that their meaning will be clear from context.

The customer 104 may transmit a request to the SCSI service 108, which may be configured to cause a LUN 110 to be added to the provider hosted customer resources 106. The request may be transmitted in the form of an appropriately configured API call, such as a web service call. The computing resource provider 102 may respond to the request for a LUN from the customer 104 with information about the LUN (i.e., information about the logical unit identified by the LUN). The information about the logical unit may include for example, the LUN to enable the customer to issue SCSI commands to be fulfilled in connection with the LUN. SCSI commands from the customer may, for instance, specify the LUN to enable the SCSI service 108 to properly execute the commands, such as by selecting from one of many LUNs provisioned for the customer.

Figure 2:
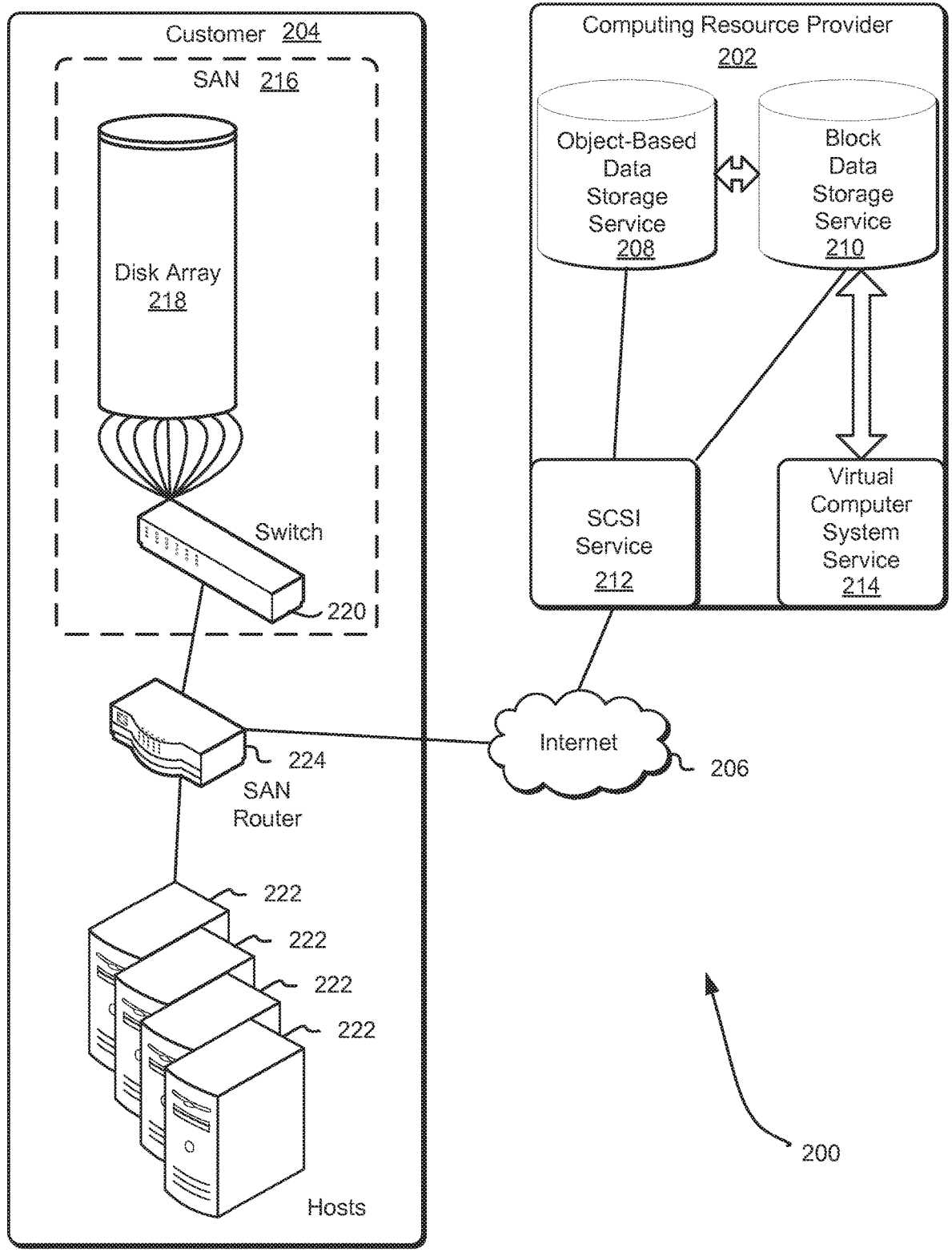
FIG. 2 shows an illustrative example of an environment in which various embodiments can be practiced.

FIG. 2 shows an illustrated example of an environment 200 in which various embodiments of the present disclosure may be practiced. The environment 200 illustrated in FIG. 2 may include components such as those described above in connection with FIG. 1. For example, the environment 200 in FIG. 2 includes a computing resource provider 202 and a customer 204. The computing resource provider 202 and customer 204 may be configured such as described above in connection with FIG. 1. As illustrated in FIG. 2, the customer 204 may communicate with the computing resource provider 202 through one or more communications networks, such as the Internet 206. Some communications from the customer 204 to the computing resource provider 202 may cause the computing resource provider 202 to operate in accordance with various techniques described herein or variations thereof.

As noted above, a computing resource provider 202 may provide various computing resource services to its customers. For instance, in this particular illustrative example, the computing resource provider 202 provides at least four services. The services provided by the computing resource provider, in this example, include an object based data storage service 208, a block data storage service 210, a SCSI service 212, and a virtual computer system service 214, although not all embodiments of the present disclosure will include all such services and, in some embodiments, additional services may be provided in addition to or as an alternative to services explicitly described herein.

The object-based data storage service 208, in an embodiment, comprises a collection of computing resources that collectively operate to store data for customers. The data stored by the object-based data storage service 208 may be organized into data objects. The data objects may have arbitrary sizes except, perhaps, for certain constraints on size. Thus, the data storage service may store numerous data objects of varying sizes. The object based data storage service may be a key value store that associates data objects with identifiers of the data objects which may be used by the customer 204 to retrieve or perform other operations in connection with the data objects stored by the object-based data storage service 208. Access to the data storage service may be through appropriately configured API calls. Further, in some embodiments, data objects stored by the data storage service are addressable using unique URLs that may encode keys for the data objects and/or logical data containers for the objects.

The block data storage service 210 in an embodiment provides block level storage volumes (e.g., virtual block storage devices) for use with the virtual computer systems provided by the virtual computer system service 214. The block data storage service 210 may, for instance, be used to provision a virtual block device to persistently store data for a virtual computer system. The virtual block device may be logically mounted to a virtual computer system to enable the virtual computer system to interact with the virtual block device as if the virtual block device was physically attached (e.g., through a serial ATA (SATA) interface). The block data storage service 210 may interact with the object-based data storage service for various reasons. For instance, snapshots of the block devices, which may be informational representations of the block devices at corresponding points in time, provided by the block data storage service 210 may be stored as data objects in the object-based data storage service. In this manner, data stored in a virtual block device may have a corresponding persistently and durably stored backup.

The SCSI service 212 in an embodiment is a service comprising a collection of computing resources collectively configured to provision logical units and process SCSI commands in connection with provisioned logical units. In an embodiment, the SCSI service 212 is configured with an interface exposed to the customer 204 that enables the customer 204 to submit SCSI commands for a LUN provisioned for the customer 204. The SCSI commands may be encapsulated in another protocol according to the manner in which communications between the customer 204 and the SCSI service 208 are made. In the particular illustrative example of FIG. 2, SCSI commands from the customer 204 may be provided to the SCSI service 212 by the customer 204 over the Internet 206. Accordingly, the SCSI commands may be encapsulated using the iSCSI protocol. The SCSI service may also be configured to process received SCSI commands and cause data to be persistently stored in accordance with the received commands. For instance, if a SCSI command is a write command, the SCSI service is configured to persist (either by itself or using another data storage service) data instructed to be written by the command.

The virtual computer system service 214 in an embodiment is a collection of computing resources collectively configured to host virtual computer systems for customers of the computing resource provider 202. Customers of the computing resource provider 202 may interact with the virtual computer systems' service to provision and operate virtual computer systems that are hosted on physical computing devices operated by the computing resource provider 202. The virtual computer systems may be used for various purposes, such as to operate as servers supporting a website. As discussed in more detail below, data corresponding to a LUN of the customer 204 may be used to provision a storage volume using the block data storage service 210 that may be logically mounted to a virtual computer system provided by the virtual computer system service 214. In this manner, a virtual computer system provisioned using the virtual computer system service 214 is able to utilize a provisioned block device as if the block device was a component of the virtual computer system itself.

The customer 204, in an embodiment, may have various computing resources under its control, where some or all of the computing resources of the customer 204 may be hosted by the customer and/or by a third party on behalf of the customer 204. In the example illustrated in FIG. 2, the customer 204 includes a storage area network (SAN) 216. The SAN 216 may include a collection of computing resources collectively configured to provide access to consolidated block level data storage which may be accessible to hosts so that, from the perspective of the hosts, one or more block storage devices operate as if locally attached to the hosts. The SAN 216 may, for instance, implement multiple logical units. A host may, for instance, issue a SCSI command that specifies a particular logical unit (e.g., by the logical unit's LUN), and the SAN will route the command to a physical data storage device of the SAN that is appropriate for fulfilling the command. The SAN may include various components to utilize various data storage techniques. For instance, the SAN may include a controller for a redundant array of independent disks (RAID) for the purpose of data durability.

In an embodiment, the SAN 216 includes various components such as a disk array 218 and a switch 220. The disk array 218 may comprise a collection of data storage devices such as hard disks or solid state storage devices that are networked together by the switch 220 to enable hosts to perform various operations in connection with data stored collectively by the disks of the disk array 218. It should be noted that, while the term "disk array" 218 is used for the purpose of illustration, various embodiments of the present disclosure are not limited to collections of storage devices that utilize spinning magnetic media. For instance, solid state drives (SSDs) and/or magnetic tape may also be used in various embodiments. In an embodiment, the switch 220 is a multi-layer director switch (MDS or fiber channel switch) configured to route SCSI commands over the fiber channel protocol (FCP).

In the example of FIG. 2, as noted, the customer includes a plurality of hosts 222, which communicate with the SAN through a SAN router 224 (or, generally, any storage router that translates communications between one protocol, such as IP, and a communication protocol used for storage, such as SCSI). A host may be a computer system, such as a server computer system, which may be physical or virtual, that is configured to utilize data storage of the SAN 216. A host 222 may, for instance, boot from a volume implemented by the SAN. A host 222 may issue SCSI commands to the SAN 216 for the purpose of performing one or more data operations (such as create, read, update, and/or delete operations). A host 222 may also receive SCSI communications from the SAN, through the switch 220 and SAN router 224, such as acknowledgments and error messages.

The SAN router 224 may be a computing device configured by hardware and/or software to route communications to multiple endpoints, such as multiple SANs or, as illustrated in FIG. 2, with a SAN and a remote endpoint. For example, a communication including a SCSI command addressed to the SAN 216 may be provided to the SAN 216 through the SAN router 224. The SAN router 224 may forward the SCSI command to the switch 220, which provides the command to an appropriate disk of the disk array 218. As discussed in more detail below, the SAN router 224 may also provide communications to the SCSI service 212 to enable utilization by the customer 204 of the SCSI service 212. For example, as discussed in more detail below, write commands issued to the SAN router 224 may be provided by the SAN router 224, both to the switch 220 for forwarding to the appropriate storage device of the disc array 218 and to the SCSI service 212. It should be noted that the SAN router may be configured to perform additional operations such as encapsulating SCSI commands in an appropriate protocol so that the commands may be provided both over the SAN 216 and over another network such as the Internet 206 to the SCSI service 212. Further, the SAN router 224 may be configured to participate in various optimization activities, such as by performing operations involved in wide area network (WAN) acceleration.

As with all environments described herein, variations are considered as being within the scope of the present disclosure. For example, FIG. 2 illustrates an environment where one or more hosts issue SCSI commands to a SAN that executes the SCSI commands accordingly. It should be noted, however, that the techniques described herein are applicable in a variety of contexts. For example, in various embodiments, a SCSI service is agnostic to the environment from which iSCSI commands are received. Generally, a SCSI service may receive iSCSI commands from any device configured to issue the commands. For instance, iSCSI commands may be issued by many types of devices such as, server computer systems, desktop computer systems, notebook (laptop) computer systems, tablet computer systems, mobile communication devices (e.g., smartphones) and/or other devices with an ability to communicate over a network to the SCSI service. As noted below, a device may execute a programming module that intercepts commands sent to a local storage device (e.g., hard drive) and replicates the commands to the SCSI service, such as by encapsulating the commands using iSCSI. Further, commands sent to the SCSI service are not necessarily replicated. Because the SCSI service provisions a LUN, the SCSI service, in some embodiments, may be used as a remote data storage device. A device may, for instance, transmit iSCSI commands to the SCSI service without issuing the commands to a local storage device. It should also be noted that, while SCSI and related protocols (e.g., iSCSI) are used extensively throughout the present disclosure for the purpose of illustration, the scope of the present disclosure is not necessarily limited to the protocols explicitly noted herein.

Figure 3:
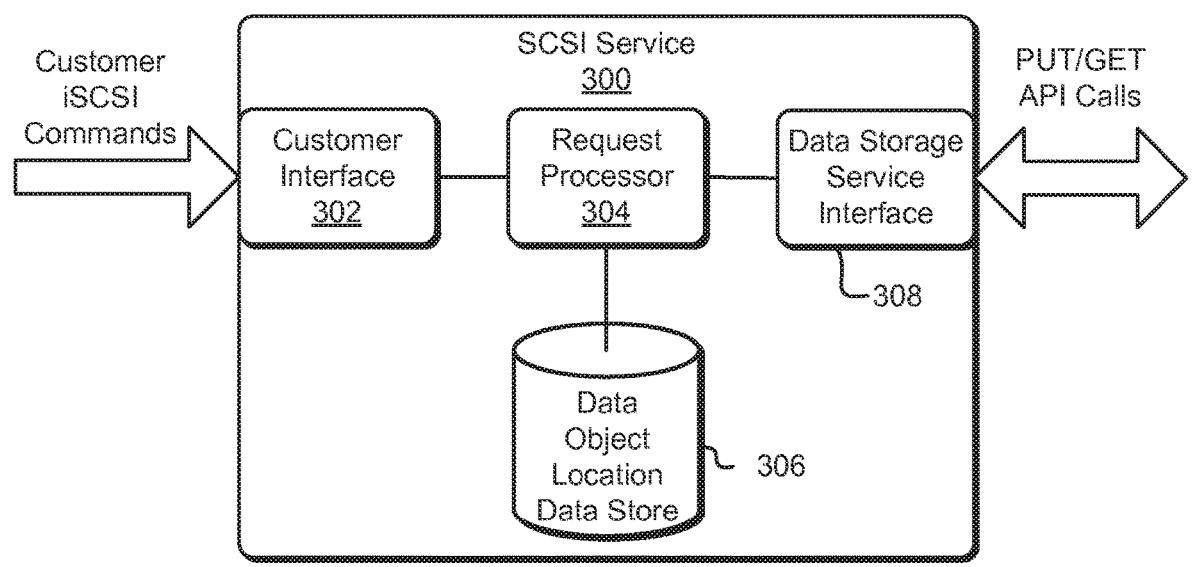
FIG. 3 shows an illustrative example of a SCSI service in accordance with at least one embodiment.

As discussed above, SCSI services in accordance with the present disclosure provide the ability to remotely perform replicated SCSI commands. SCSI services, therefore, may include appropriate computing resources to enable the receipt and execution of received SCSI commands. FIG. 3 shows an illustrative example of a diagram representing such a SCSI service 300 in accordance with an embodiment. The SCSI service 300 may be for example the SCSI service described above in connection with FIG. 1 or 2. As noted above, a SCSI service may include a collection of computed resources collectively configured to operate in various ways such as described herein. For instance, in an embodiment, the SCSI service 300 comprises a plurality of subsystems that enable the SCSI services' operations. For example, the SCSI service 300 includes a customer interface 302. The customer interface 302 may be implemented by a subsystem of the SCSI service 300. The customer interface 302 may provide a mechanism by which customers are able to communicate with the SCSI service in order to utilize the SCSI service 300. In an embodiment, the customer interface 302 allows remotely generated API calls to be submitted to the SCSI service 300. Such API calls may be for example, web service calls. Accordingly, the SCSI service 300 may include one or more web servers used to implement to the customer interface 302. API calls may be used for example to transmit to a computing resource provider hosting the SCSI service 300 a request to provision a LUN (i.e., provision a logical unit) and/or to perform other operations such as deprovisioning a LUN, provisioning a storage volume from a LUN, and/or other operations. The customer interface 302 may also be configured to receive SCSI commands encapsulated in an appropriate protocol such as iSCSI or in another appropriate protocol. Communications encapsulating the SCSI commands may include information that enables the SCSI service 300 to identify an identity of the customer, ensure that the command is authentic, and to identify the appropriate LUN of the customer in connection with which the command is to be performed and/or to otherwise ensure that SCSI commands and other communications should be and are correctly executed/fulfilled.

In an embodiment of the SCSI service 300 includes a request processor 304. The request processor 304 may be a computer system, which may comprise one or more computing devices collectively configured to process requests submitted by customers through the customer interface 302. The request processor 304 may, for instance, be configured to generate appropriate communications to other sub-systems (such as appropriately configured API calls) and to process responses from the other systems. In some examples, the request processor 304 is configured to utilize a data object location data store to correctly perform the requested operations. As an illustrative example, if the customer interface 302 receives a SCSI command to perform a write operation on a particular block of data identified in the request, the request processor 304 may access the data object location data store 306 to identify which data object of an object based data storage service is affected by the write, that is, to identify which data object contains data of the particular data block.

The request processor may use for example, customer identity, a LUN and identifier of the particular block to identify a data object which contains the particular block. The data object location data store 306 may be configured to associate (e.g., by using relational database tables) customer identities with any LUNs provisioned for the customer and associate blocks of any LUN provisioned for the customer with data objects that store data of the blocks. For example, the request processor 304 may issue a query to the data object location data store 306 that specifies enough information to enable the data object location data store 306 to identify a data object location for a data object that contains data for a block specified by the query. It should be noted that the request processor 304 may be configured to utilize the data object location data store 306 to identify multiple data objects, if applicable, such as for SCSI commands that affect multiple data blocks. Further, the data object location data store 306 may be configured to provide information that enables the request processor 304 to obtain appropriate data objects. For example, in instances where data objects are stored in a key-value store, the data object location data store 306 may be configured to provide keys for data objects. In some embodiments, the keys may be specified in uniform resource locators (URLs) that may be used in web services requests to retrieve data objects using an object-based data storage service web service interface.

As illustrated in FIG. 3, the SCSI service 300 includes a data storage service interface 308. As noted above, in various embodiments, data for data blocks are stored in data objects which themselves may be stored by an object-based data storage service, which may operate as a key-value store. Accordingly, the data storage service interface 308 may be configured to receive commands from the request processor 304 to perform operations in connection with the data objects that contain data of the data blocks affected by SCSI commands received through the customer interface 302. For example, the data storage service interface 308 may be configured to receive a command to retrieve one or more data objects from an object-based data storage service. Retrieval of the one or more data objects may include generating and transmitting one or more commands to the object-based data storage service.

Accordingly, the data storage service interface may include one or more servers configured to transmit appropriate configured API calls to a data storage service for the purpose of performing various operations, such as adding data objects to the data storage service, obtaining data objects from the data storage service, updating data objects from the data storage service, deleting data objects from the data storage service and/or performing other operations. Such API calls may be transmitted over one or more networks such as the Internet, if the object-based data storage service is remotely hosted or over a local area network if the object-based data storage service is locally hosted. In addition, it should be noted that while various embodiments in the present disclosure are discussed in connection with a SCSI service that operates separately from an object based data storage service, the SCSI service may store data objects itself in addition to or instead of storing data objects using another service. For example, in some embodiments the SCSI service 300 may include a key value store operated by the SCSI service 300 for the purpose of supporting the SCSI service 300. However, use of a separate data storage service apart from a SCSI service provides numerous technical advantages, such as the ability to leverage an existing data storage system without the need to build another data storage service to support the SCSI service.

Figure 4:
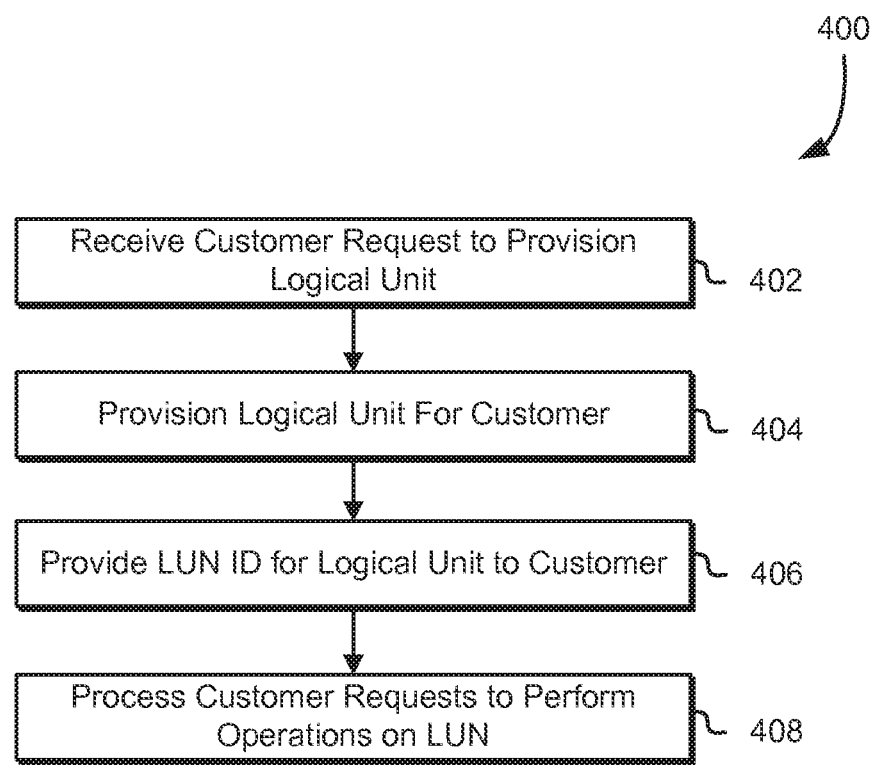
FIG. 4 shows an illustrative example of a process for providing a SCSI service in accordance with at least one embodiment.

FIG. 4 shows an illustrative example of a process 400 for providing a SCSI service in accordance with an embodiment. The process 400 illustrated in FIG. 4 and variations thereof may be performed by any suitable system such as a system providing a SCSI service described above. In an embodiment the process 400 includes receiving 402 a customer request to provision a logical unit. The request to provision the logical unit may be received in any suitable manner. For example, as noted above, a computing resource provider that operates a SCSI service may provide a web service interface that allows web service requests to be submitted to the web service interface. Accordingly, the request to provision a logical unit may be received as an appropriately configured web service request or other API call. Additionally, the request may include any information required and/or usable by a system performing the process 400 for various purposes. Example information includes authentication information that the system can use to determine whether the request is authentic (e.g., authorized by an entity with authority in the system to make such authorizations), information identifying an entity that submitted the request, which may be a customer identifier for a customer of a computing resource provider, information specifying a size for the logical unit and/or other information. In some embodiments, the request may specify a LUN to be used for the provisioned logical unit, although the system performing the process 400 may assign one itself without specification from the customer.

Upon receipt 402 of the customer request to provision a logical unit, the process 400 may include provisioning 404 a logical unit for the customer. Provisioning the logical unit for the customer may include configuring one or more computing resources hosted by a system performing the process 400 in order to enable the customer to submit requests to the SCSI service using the SCSI protocol in connection with the provisioned logical unit. Provisioning the logical unit may include, for example, updating one or more records for one or more subsystems so that, when an authentic SCSI command is received for the LUN, the command can be executed for the LUN. As an example, in embodiments that use digital signatures to authenticate commands received, provisioning the LUN may include updating any authentication subsystems with a signing key used to verify the authenticity of commands. In addition, one or more accounts in a database may be created for the LUN so that, for instance, information usable to locate data objects that encode data of data blocks are locatable. Generally, provisioning the logical unit may include any operations (which may be orchestrated by execution of a provisioning workflow) that enable authentic SCSI commands to be submitted and executed upon submission.

It should be noted that the LUN may be thinly provisioned. For example, the request to provision the logical unit may specify, in some embodiments a size for the logical unit, such as one terabyte. Provision in the logical unit does not necessarily include provisioning a specified amount of storage space, or for that matter any storage space for the logical unit. A LUN identifier (LUN ID) may be provided 406 to the customer in response to the customer request that was received 402. The LUN ID may be provided 406, for example, in an acknowledgment that the logical unit was provisioned. In some embodiments, the LUN ID is the LUN. It should be noted that, in such embodiments, the LUN ID is not necessarily provided to the customer, such as when the customer specified the LUN in the request. In other embodiments, the LUN ID is different from the LUN, and may be another identifier that uniquely identifies the LUN among LUNs of the entity on behalf of which the corresponding logical unit was provisioned and/or among a larger universe of logical units, such as all logical units provisioned for all customers of a computing resource provider.

In some embodiments for example, the LUN ID is provided 406 synchronously in a response to the customer request to provision the logical unit. However, the LUN ID may be provided asynchronously and not necessarily in response to the received customer request. Once the LUN ID has been provided 406 to the customer, the process 400 may include processing customer requests to perform 408 operations on the logical unit having provided LUN ID. The request to perform 408 operations may be provided using the SCSI protocol.

As with all processes described herein, variations of the process 400 are considered as being within the scope of the present disclosure. For instance, as noted above, some embodiments may include circumstances where an entity (e.g., customer of a computing resource provider) utilizes a storage router that performs various operations as part of WAN acceleration. Such storage routers often require or perform optimally when another storage router at a destination additionally participates in the WAN acceleration, which may utilize various proprietary protocols that may be specific to the manufacturer of the storage router. Accordingly, in various embodiments, an entity is able to specify (e.g., as part of the request to provision a logical unit) a storage router to be used, such as by selecting a manufacturer and/or model number from a set of manufacturers and/or model numbers available for selection. A system performing the process 400 may provision the specified storage router as part of provisioning the LUN. The storage router may be provisioned in various ways. For instance, a physical routing device of the specified manufacturer may be operationally connected to a network configured to receive communications from the requesting entity. As another example, a virtual computer system or other device may be provisioned to use a protocol of the specified storage router. If a proprietary protocol, the protocol may be used under license or other permission.

Figure 5:
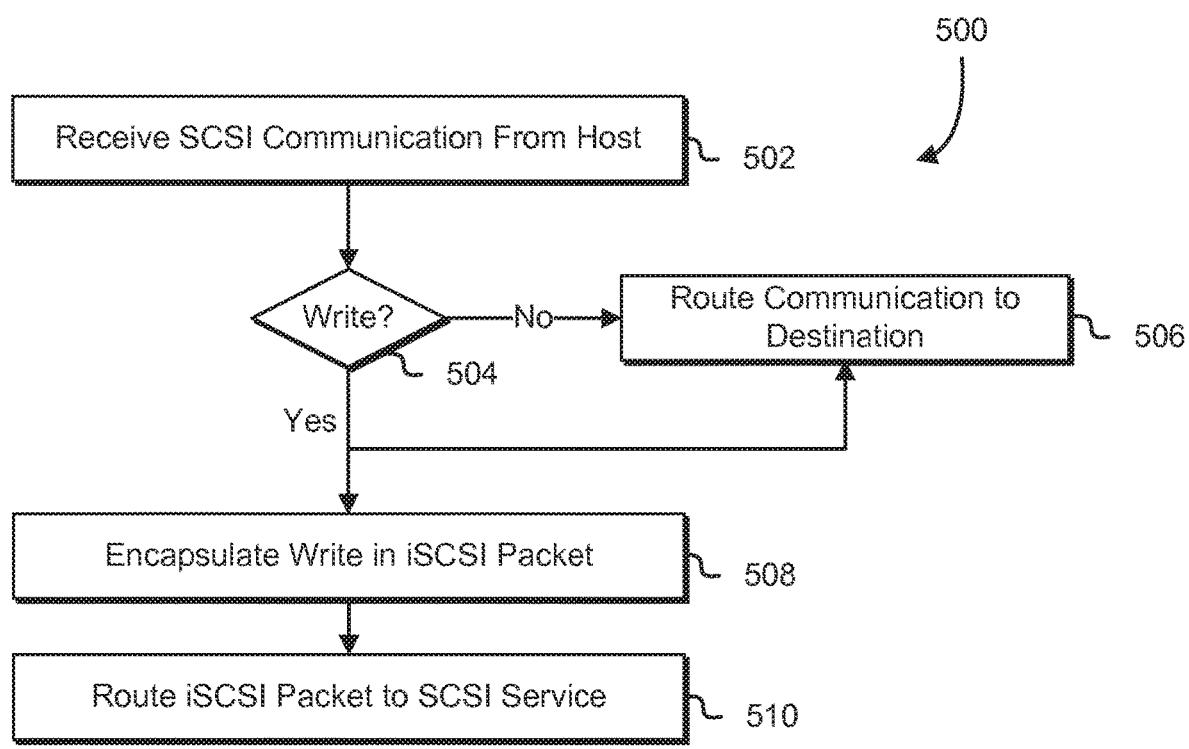
FIG. 5 shows an illustrative example of a process for replicating data to a SCSI service in accordance with at least one embodiment.

Once a logical unit is provisioned, various embodiments of the present disclosure allow for replicating SCSI commands to a remote endpoint. FIG. 5, accordingly, shows an illustrative example of a process for routing SCSI commands in accordance with an embodiment. The process 500 may be performed by any suitable device, such as by the SAN router 224 discussed above in connection with FIG. 2 or, generally, any device in the communication path for SCSI commands from a host. In an embodiment, the process 500 includes receiving 502 a SCSI communication from the host, which may be a computing device such as described above and/or below. The SCSI communication may include a SCSI command, which may be encapsulated utilizing an appropriate protocol. For example, if the command is received over a fiber channel, the SCSI communication may include a SCSI command encapsulated using the fiber channel protocol (FCP). As another example, over an IP network, the SCSI communication may be received as an iSCSI packet that encapsulates a SCSI command.

Upon receipt of the SCSI communication from the host, the process 500 may include determining 504 whether the SCSI communication corresponds to a write command, such as a command to write certain data to a particular block of data specified in the SCSI communication. Determining whether the SCSI communication corresponds to a write command may include extracting the SCSI command from the SCSI communication and checking whether the communication includes a command corresponding to any of the multiple available types of SCSI write commands. If it is determined 504 that the SCSI communication does not include a write command, the process 500 may proceed to route 506 the communication to a destination specified in the SCSI communication. For example, if the SCSI communication is an iSCSI communication, the iSCSI communication may be routed to an IP address specified in the iSCSI communication.

If it is determined 504 that the SCSI communication does, in fact, include a write command, the communication may also be routed 506 to the destination, such as described above. Additionally, the write command may be encapsulated 508 in an iSCSI packet. Encapsulating the write in the iSCSI packet may include generating an iSCSI packet that has information suitable to enable a receiver of the iSCSI packet to process the write command. For example, referring to FIG. 2, the iSCSI packet may include a LUN ID for the LUN to which the write applies, and authentication information such as an access key and a secret access key which may be used by a computing resource provider or other receiver of the iSCSI packet to determine that the command is authentic and should be fulfilled. Generally, the iSCSI packet may be configured in any way such that the iSCSI is properly processed by a SCSI service to which the iSCSI packet will be routed. Accordingly, once the write is encapsulated in the iSCSI packet, the process 500 may include routing 510 the iSCSI packet to the SCSI service, such as described above in connection with FIG. 2.

It should be noted that, as with all processes described herein, variations are considered as being within the scope of the present disclosure. For instance, while FIG. 5 illustrates a process which may be performed by a storage router that operates in connection with a SAN, various embodiments of the present disclosure do not necessarily utilize a storage router and/or a SAN. A programming module (e.g., software agent) on a host (e.g., device such as listed above) that issued the SCSI communication, for instance, may be configured to intercept SCSI communications at the host (i.e., internally). Upon intercepting a SCSI communication and determining that the SCSI communication contains a write command, the programming module may transmit the write command in an iSCSI packet to the SCSI service. The host may also transmit the SCSI communication to a SAN, network or local storage device—in other words, a host upon detecting a write command may transmit two communications: one to a primary storage device and another to a SCSI service. Further, as noted above, a device does not necessarily need to send commands to two (or more) destinations. For example, in some embodiments, a device is able to use a SCSI service for primary storage without sending commands to local storage, a network storage device or a SAN.

In various embodiments, regardless of whether the host sends SCSI communications first to a storage router that sends two communications, or whether the host sends two communications itself, the two different communications may be sent according to different protocols. In one example, for instance, the host may send a SCSI communication comprising a SCSI command encapsulated in a fiber channel protocol to a SAN and may send an iSCSI packet to a SCSI service. It should be noted however, that the two communications transmitted from either the host or the storage router may also be of the same protocol. For instance, if both the SAN and SCSI service received communications according to the iSCSI protocol, the two communications may utilize the same protocol.

In addition, various additional operations may be performed in connection with the process 500 illustrated in FIG. 5. As noted above, for example, some storage routers may perform various operations to participate in WAN acceleration. Accordingly, the process 500 may, in various embodiments, include performing such operations. In some examples, a storage router at the SCSI service may additionally participate in WAN acceleration, such as by decompressing compressed network traffic from a device performing the process 500.

Figure 6:
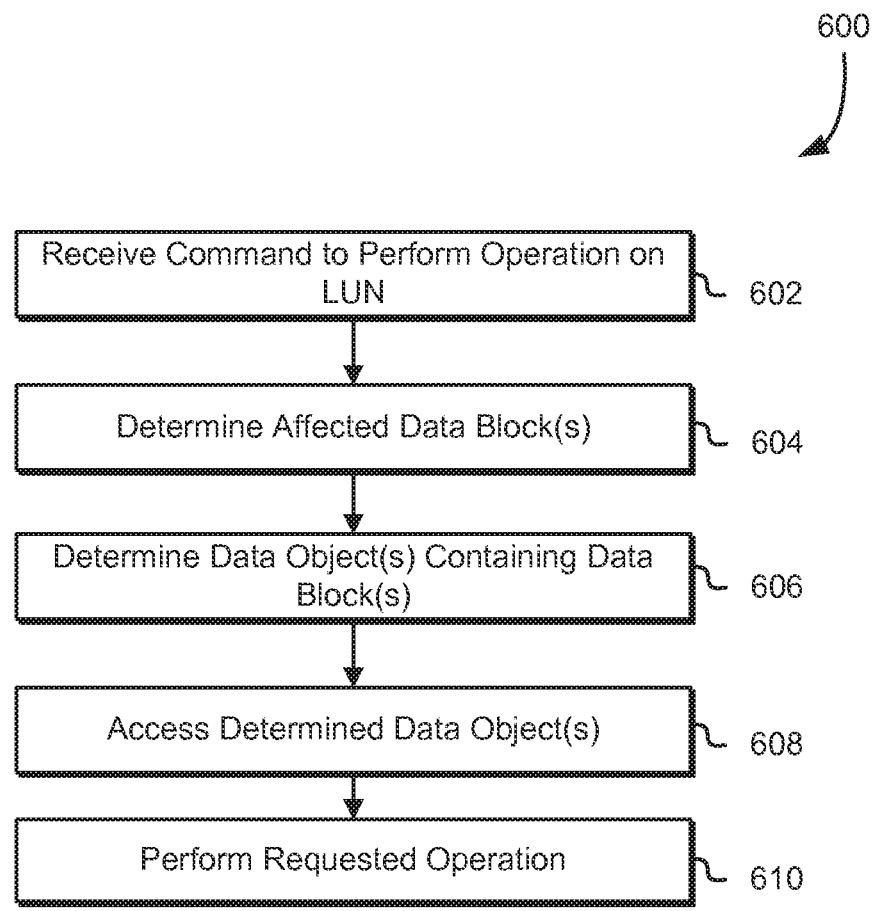
FIG. 6 shows an illustrative example of a process for processing commands to perform data operations in accordance with at least one embodiment.
Figure 7:
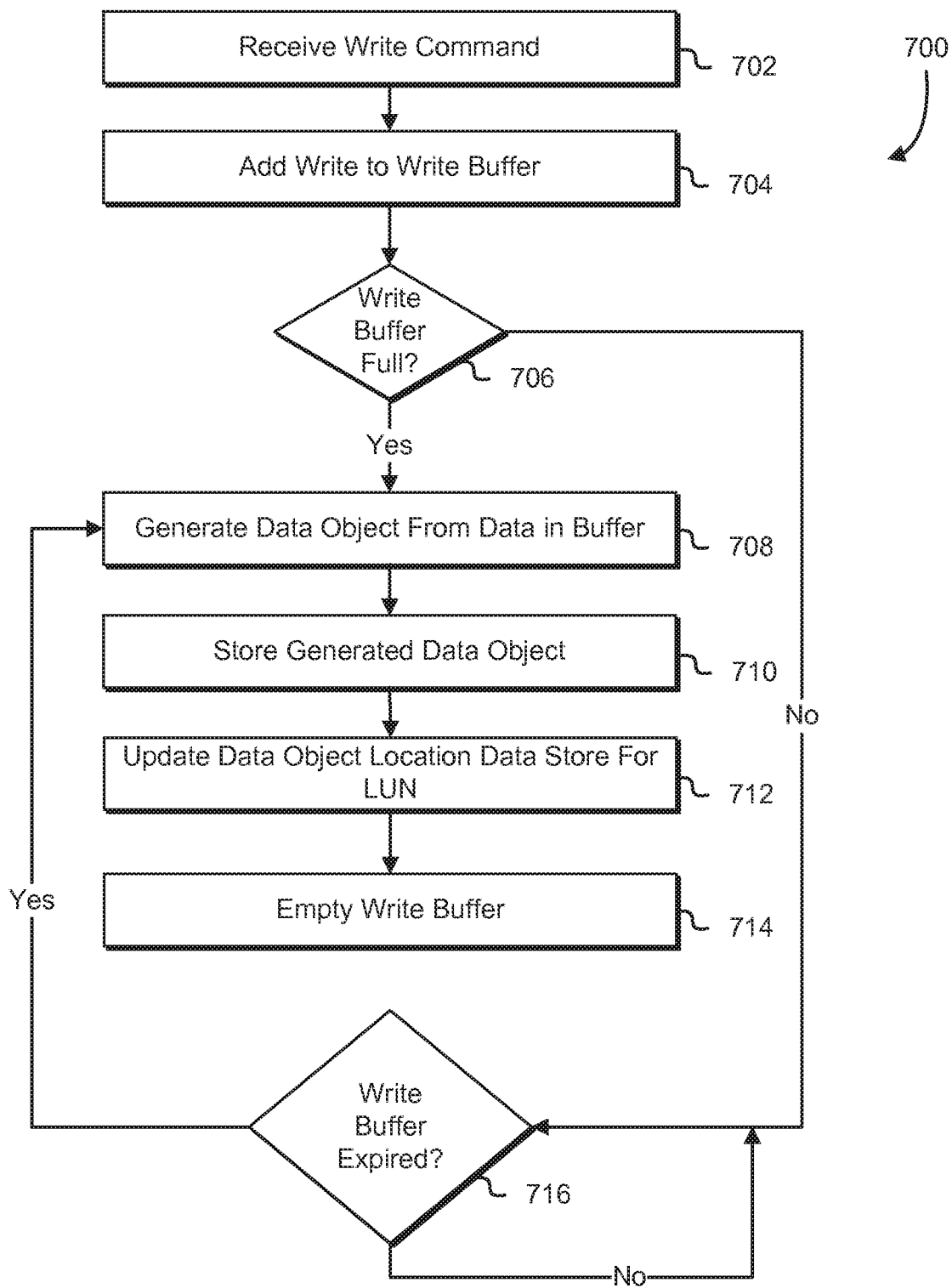
FIG. 7 shows an illustrative example of a process for using a buffer to process write commands in accordance with at least one embodiment.

Once communications containing SCSI commands are forwarded to a SCSI service, the communications may be processed so that, if applicable, SCSI commands are executed accordingly. FIG. 6, accordingly, shows an illustrative example of a process 600 which may be used to provide a SCSI service such as described above. The process 600 may be performed by any suitable system such as by a SCSI service described above in connection with FIG. 3. In an embodiment, the process 600 includes receiving 602 a command to perform an operation in connection with a LUN. The command may be received for example, in the form of an iSCSI packet that encapsulates a SCSI command. A SCSI command may identify by a LUN ID the logical unit for which the operation is to be performed. Once the command has been received, the process 600 may include determining 604 one or more data blocks affected by performance of the received command. For example, if the command is to write certain data to a block, an identifier of the block, such as a logical block address (LBA), may be determined. Determining the affected data block may be performed by accessing an identifier of the determined data block (e.g., an LBA for the block) from the command that was received.

In instances where the command may affect multiple data blocks, multiple data blocks may be determined, for example by using an LBA and transfer length of the SCSI command to determine the number of contiguous data blocks starting at the block specified by the LBA. Once if one or more affected data blocks have been determined 604, the process 600 may include determining 606 one or more data objects containing the one or more affected data blocks. Determining 606 the one or more data objects may be performed in any suitable manner, and the manners by which it is performed may vary in accordance with the various embodiments. For example, as noted above, a SCSI service may maintain a database that associates data blocks of a LUN with data objects. The database may, for instance, associate a data block with a data object in which data for the data block is stored by associating an LBA for the data block with a key usable in a key-value store to access a data object that stores data for the data block. Accordingly, a query specifying one or more applicable keys may be ran against the database to access the appropriate data object(s).

Once the appropriate one or more data objects have been determined 606, the process 600 may include accessing 608 the determined one or more data objects. Accessing 608 the one or more determined data objects may be performed in any suitable manner. For instance, in an embodiment the data objects are stored in a key value store where key values are associated with data objects. Determining the data objects may include determining the keys for the data objects, and the keys may be used to retrieve the data objects from the key value store. In addition, the key value store may be operated as another service independent of a service which performs the process 600. Accordingly, accessing the one or more determined data objects may include configuring and transmitting appropriately configured API calls to the other service in order to retrieve the data objects from the other service—that is, transmit a request to retrieve the one or more data objects from the data storage service and receive the data objects' response.

Once the determined one or more data objects have been accessed 608, the requested operation may be performed 610. It should be noted that performing the requested operation may be performed in various ways which may differ in accordance with the various embodiments. For example, if the requested operation is a write operation, performing the requested operation may include updating a portion of the data object affected by the write operation—that is, a portion of the data object corresponding to the affected blocks. Performing the requested operation may also include storing an updated data object, for example, by transmitting, via an appropriately configured API call, an updated data object to a data storage service that stores data objects.

It should be noted that, write operations do not necessarily require retrieval of data objects from storage. For instance, if data for a particular data block is to be rewritten upon execution of a SCSI command, the new data may be written to a new data object, with the old data remaining in another data object. Only certain operations (e.g., read operations) may require retrieval of data objects since other operations (e.g., write operations) can be performed using new data objects. Accordingly, performing the requested operation may also include managing metadata that is used to track associations between data blocks and data objects accordingly. For example, if a received command is a write command for a particular data block, a database can be updated accordingly. For instance, if an entry for the data block is already in the database, the database may be updated to reflect an association with the data object in which the data for the data block is written or will be written. In this manner, the data for the data block can be accessed using information provided in the database.

As noted above, operation of a SCSI service may operate in order to optimize performance. For instance, in some embodiments, a key value store is utilized so that there is a data object for each data block for which there is data written. Thus, if a volume has data written to 1,000 data blocks, a SCSI service may cause to be stored 1,000 data objects, one for each data block. As additional data blocks are written, additional data objects may be created. In some embodiments however, performance may be improved by buffering writes and generally by creating data objects which may have data for varying number of data blocks among themselves.

Figure 8:
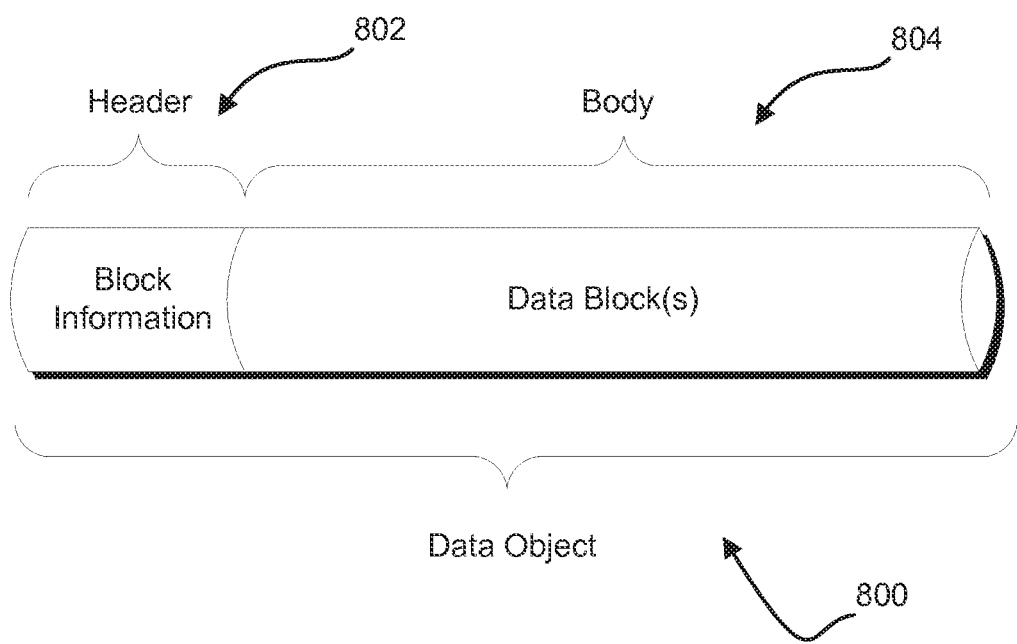
FIG. 8 shows an illustrative diagram showing a configuration of a data object in accordance with at least one embodiment.

Data objects may be configured in various ways in accordance with various embodiments. In some examples, for instance, data objects are comprised from simply a sequence of bits formed from corresponding data for data blocks. Data objects may also be configured with additional information that enables location of data for data blocks in the data object. FIG. 8 accordingly shows an illustrative example of a data object 800 in accordance with various embodiments. In this particular example, the data object 800 includes a header 802 and a body 804. In an embodiment, the header 802 includes block information which may be information that enables the location of data for one or more blocks in the body 804. Thus, for example, to perform a read operation using a SCSI service, the block information in the header 802 need be used to determine what data is to be read from the body 804. The header may encode this information in various ways in accordance with the various embodiments. For example, the header may include a table that associates logical block addresses with information identifying which bits of the body 804 contain the corresponding data. The information may directly specify the bits or may indirectly specify the bits, such as by specifying an offset from a particular bit in the data object. An LBA's position in a table (or other mechanism) may also indicate where corresponding data may be found in the body 804. For instance, since data blocks are, in various embodiments, uniform size, an LBA in the third position in a sequence of LBAs may indicate that the location for corresponding data is found in a position that occurs after a number of bits corresponding to two data blocks.

Upon adding 704 data to the write buffer, the process 700 may include determining 706 whether the write buffer is full. Determining 706 whether the write buffer is full may be performed by comparing the amount of data in the buffer with a threshold value for the buffer. For example, the write buffer may be considered full if the write buffer is more than 80% of some predefined value, although thresholds and/or other conditions may be used to determine whether the write buffer is full. If it is determined 706 that the write buffer is full, the process 700 may include generating 708 a data object from the data in the buffer. Generating the data object from the data in the buffer may include generating the data object in manner that allows for location of data within the data block using appropriate information, such as a logical block addresses. An example way of configuring a data object is discussed below.

Figure 9:
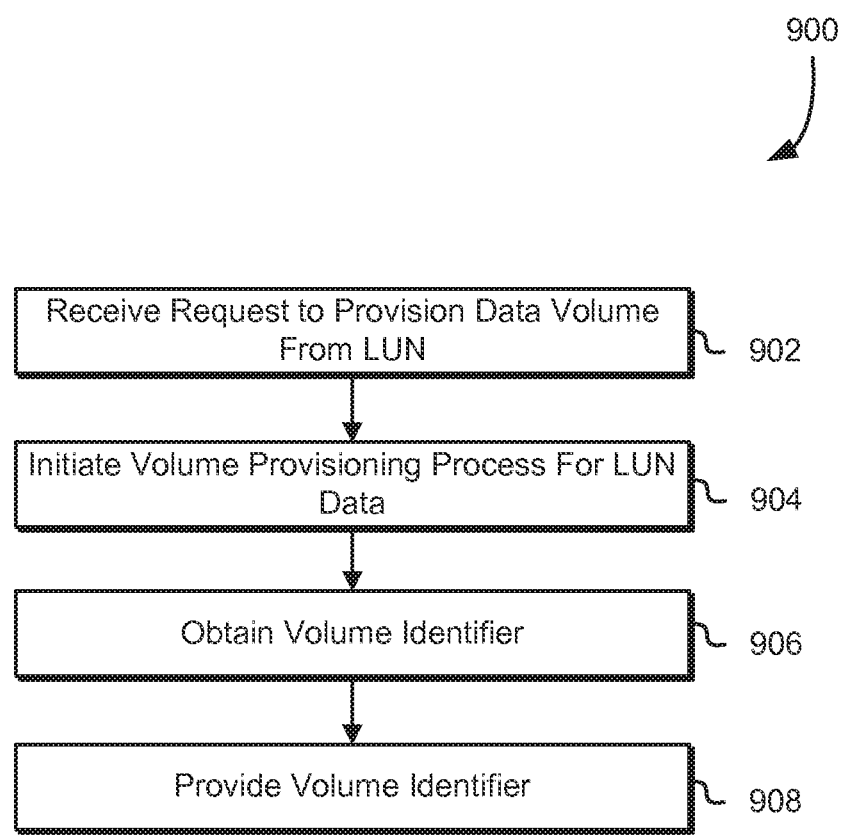
FIG. 9 shows an illustrative example of a process for generating a data volume from data stored using a SCSI service in accordance with at least one embodiment.

As noted above, various embodiments of the present disclosure allow for various uses of a SCSI service. FIG. 9, for example, shows an illustrative example of a process 900 for utilizing data obtained through a SCSI service to provision a volume that may be logically attached to another computer system to use data in the volume. The process 900 may be performed by any suitable system such as by SCSI service described above, or generally by any subsystem of a computing resource provider that is configured to perform the operations of the process 900. In an embodiment, the process 900 includes receiving 902 a request to provision a data volume from a LUN (i.e., from a logical unit identified by a LUN). The request may be received 902 in any suitable manner such as in the form of a web service or other API call that identifies the LUN and that includes additional information used to authenticate the request. As a result of having received 902 the request to provision a data volume from the LUN, a volume provisioning process for data of the LUN may be initiated 904.

Once the data object location data store has been updated 712, the process 700 may include emptying 714 the write buffer. If upon adding 704 the write to the write buffer, it is determined 706 that the write buffer is not full, a determination may be made whether the write buffer is expired. A write buffer may for example, have an expiration such that regardless of whether the write buffer is full, if the write buffer contains data, the data is stored in a data object such as described above. The write buffer may have an expiration time selected to reduce the risk of a malfunction of a system maintaining the write buffer causing data corruption. For instance, the write buffer may have an expiration time of five seconds from the time data is written to the write buffer from an empty state.

Determining 716 whether the write buffer is not empty and expired may be performed repeatedly until it is determined 716 that the write buffer and expired. When determined 716 that the write buffer is expired, the process 700 may include generating 708 and storing 710 a data object comprising data from the write buffer, and updating an appropriate data object location data store and emptying 714 the write buffer such as describe above. As write commands are received, the process 700 or variations thereof may be repeated accordingly. In this manner, a data object is not necessarily created for each write, but data for writes are collected and used to generate data objects in batches. Further, because data objects may be created due to either expiration of filling of a write buffer, data objects storing the data for data blocks may vary in size.

FIG. 8 accordingly shows an illustrative example of a data object 800 in accordance with various embodiments. In this particular example, the data object 800 includes a header 802 and a body 804. In an embodiment, the header 802 includes block information which may be information that enables the location of data for one or more blocks in the body 804. Thus, for example, to perform a read operation using a SCSI service, the block information in the header 802 need be used to determine what data is to be read from the body 804.

FIG. 9 shows an illustrative example of a process 900 for utilizing data obtained through a SCSI service to provision a volume. The process 900 may be performed by any suitable system such as by SCSI service described above, or generally by any subsystem of a computing resource provider that is configured to perform the operations of the process 900. In an embodiment, the process 900 includes receiving 902 a request to provision a data volume from a LUN. The request may be received 902 in any suitable manner such as in the form of a web service or other API call that identifies the LUN and that includes additional information used to authenticate the request. As a result of having received 902 the request to provision a data volume from the LUN, a volume provisioning process for data of the LUN may be initiated 904. Initiating the volume provisioning process for the LUN data may be performed in any suitable manner. For instance, in the example of FIG. 2, where a computing resource provider includes an object based data storage service and a block data storage service, data from the object based data storage service may be accessed and used to provision a volume that is provided from the block data storage service. Data from the object based data storage service accordingly may be transferred from the object based data storage service to the block data storage service. A volume identifier for the initiated volume may be obtained 906 in the example of FIG. 2 for instance, SCSI service if performing the process 900 may include an identifier from the block data storage service. Upon obtaining 906 the volume identifier, the process 900 may include providing 908 the volume identifier to the entity that submitted the received 902 request, such as a customer of a computer resource provider performing the process 900. It should be noted that the volume does not need to be completely initiated before the volume identifier is provided 908 and the volume is used. For example, in an example where the volume is provisioned by transferring data from an object based data storage service to a block data service that hosts the volume, the data transfer may be a gradual process, as discussed below.

Initiating the volume provisioning process for the LUN data may be performed in any suitable manner. For instance, in the example of FIG. 2, where a computing resource provider includes an object based data storage service and a block data storage service, data from the object based data storage service may be accessed and used to load data for a from the block data storage service. The data may be loaded to a virtual or physical block device. Data from the object based data storage service accordingly may be transferred from the object based data storage service to the block data storage service. A volume identifier for the initiated volume may be obtained 906. In the example of FIG. 2, for instance, a SCSI service, if performing the process 900, may obtain an identifier from the block data storage service that provisions the volume. Upon obtaining 906 the volume identifier, the process 900 may include providing 908 the volume identifier. The volume identifier may be provided, for instance, to the entity that submitted the received 902 request, such as a customer of a computer resource provider performing the process 900. In addition or as an alternative, the volume identifier may be provided to a virtual computer system service that operates collectively with a block data storage service to logically mount (e.g., operationally connect over a network so that the virtual computer system can interact with the volume as if locally connected) the volume to a virtual computer system provided by the virtual computer system service.

It should be noted that the volume does not need to be completely initiated before the volume identifier is provided 908 and the volume is used. For example, in an example where the volume is provisioned by transferring data from an object based data storage service to a block data service that hosts the volume, the data transfer may be a gradual process. In the context where the volume is provisioned by a block data storage service using data from an object-based data storage service, when operations against data in the volume are to be performed, a check whether the data is already in the volume or still in the object-based data storage service may be made. If the data is in the object-based data storage service, the data may be immediately loaded form the object-based data storage service so that the operation can be performed. Other variations are also considered as being within the scope of the present disclosure.

Figure 10:
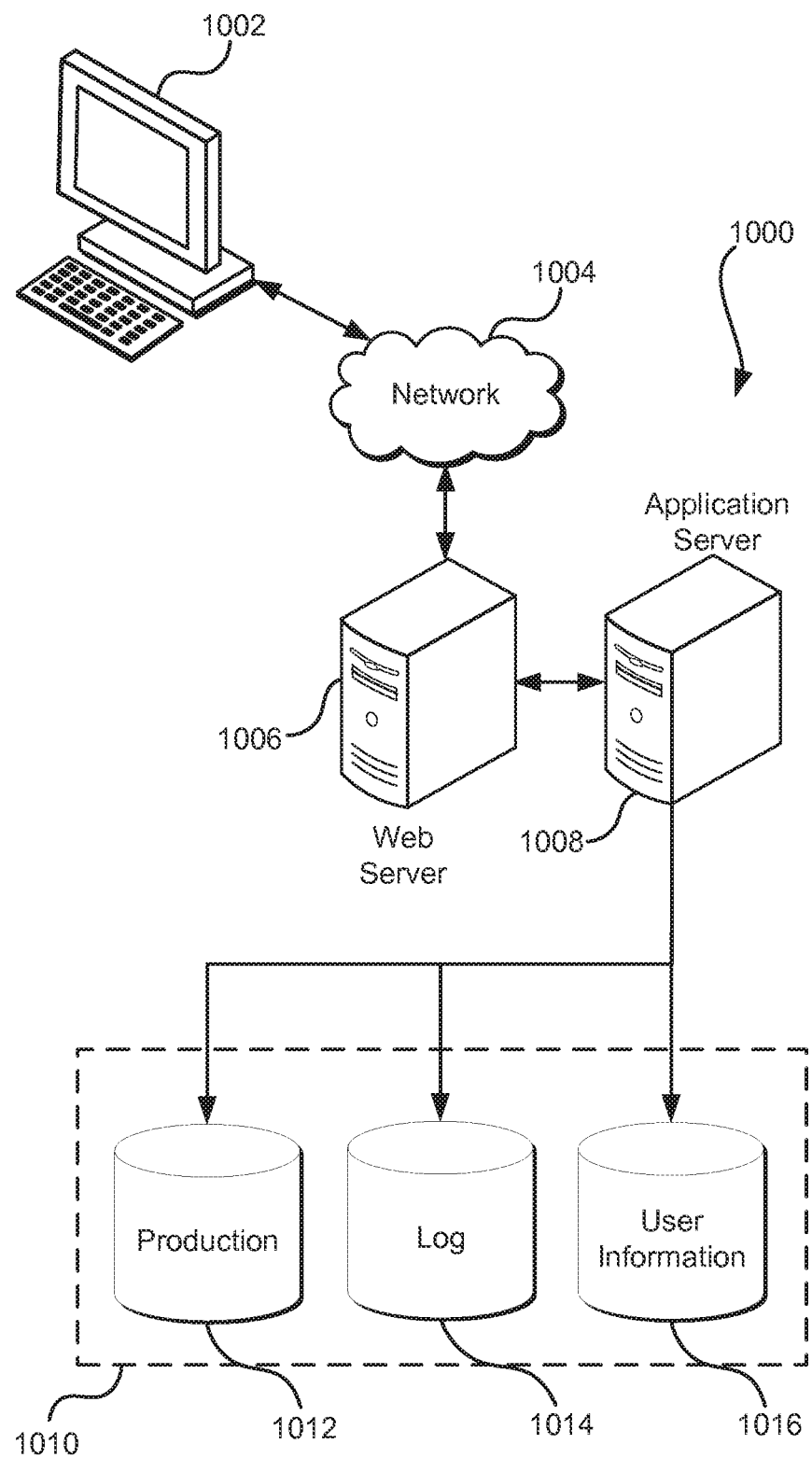
FIG. 10 illustrates an environment in which various embodiments of the present disclosure can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1010 can include several separate data tables, databases or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
provisioning a virtual storage device addressable using a block-level communication protocol;
obtaining a plurality of write commands that are configured according to the block-level communication protocol and that address the provisioned virtual storage device;
aggregating the plurality of write commands into an aggregate write command;
executing the aggregate write command by at least:
providing a web service application programming interface call to a web service to cause data associated with a write command of the plurality of write commands to be persisted as part of a corresponding data object in a key-value data store accessible via the web service, the data object being retrievable from the key-value data store by referencing a key for the data object, wherein causing the data of the write command to be persisted as part of the data object includes aggregating data for multiple write commands into the data object, wherein the write command comprises updated data for a data block having a data block address, the data block having data corresponding to the data block address stored in another data object as a result of a previous write command specifying the data block address; and
storing information associating the key with one or more data block addresses, including the data block address, specified by the write command of the plurality of write commands; and
providing the write command to a block data storage system separate from the key-value data store, wherein data according to the write command is persisted as a data block by the block data storage system.

2. The computer-implemented method of claim 1, wherein the block-level communication protocol is a small computer system interface protocol.

3. The computer-implemented method of claim 1, wherein:
the virtual storage device is implemented by one or more computer systems hosted by a computing resource provider; and
the plurality of write commands are generated remotely from the computing resource provider by a customer of the computing resource provider.

4. The computer-implemented method of claim 1, wherein the obtained plurality of write commands are encapsulated using another communication protocol when obtained.

5. The computer-implemented method of claim 1, further comprising:
obtaining a read command configured according to the block-level communication protocol and addressing the provisioned virtual storage device, the read command specifying a data block address;
using the key-value data store to determine, based at least in part on the specified data block address, a key for a data object in which data responsive to the read command is located;
using the determined key to retrieve a data object corresponding to the key;
extracting, from the retrieved data object, the data responsive to the read command; and
providing the extracted data responsive to the read command in response to the read command.

6. The computer-implemented method of claim 1, wherein causing data of the write command to be persisted as part of a data object in a key-value data store comprises submitting a web service call to a data storage service that implements the key-value data store.

7. The computer-implemented method of claim 1, wherein:
at least one write command of the subset of the plurality of write commands comprises updated data for a data block having a data block address, the data block having data corresponding to the data block address stored in another data object as a result of a previous write command specifying the data block address; and
the one or more data block addresses includes the data block address.

8. A computer-implemented method, comprising:
obtaining a write command configured according to a first communication protocol, the write command specifying an identifier for a data block, stored in a virtual storage device;
aggregating the write command and a different write command into an aggregated write command; and
executing the aggregated write command by at least:
providing a web service application programming interface call to a web service to cause data of the write command to be persisted, with other data from the different write command, as part of a data object in a key-value store accessible via the web service, the data object retrievable from the key-value store using a key associated with the data object, wherein the write command and the different write command comprise updated data for the data block having a data block address, the data block having data corresponding to the data block address stored in another data object as a result of a previous write command specifying the data block address;
causing data according to the write command to be persisted as a data block at a block data storage system;
causing data according to the write command to be persisted as a data object at the key-value store; and
associating, in a data store, separate from the virtual storage device, the key with the identifier for the data block.

9. The computer-implemented method of claim 8, wherein the command is a small computer system interface command and the first communication protocol is a small computer system interface protocol.

10. The computer-implemented method of claim 8, wherein:
the web service is implemented by one or more computer systems hosted by a computing resource provider; and
the command is remotely generated by a customer of the computing resource provider from which the command was obtained.

11. The computer-implemented method of claim 8, wherein the write command is a replication of a command provided to a storage area network.

12. The computer-implemented method of claim 8, further comprising:
obtaining a read command that specifies the identifier specific to the data block;
using the identifier to determine the key;
using the key to retrieve the data object;
extracting the data of the write command from the retrieved data object; and
providing the extracted data in response to the read command.

13. The computer-implemented method of claim 8, wherein the data object contains data of other data blocks.

14. A system, comprising:
one or more processors; and
memory including instructions that, as a result of execution by the one or more processors, cause the system to imitate a block-level storage device by at least:
providing a block-level data storage interface;
obtaining, to the block-level data storage interface, a plurality of block-level commands;
aggregating the obtained plurality of block-level commands into an aggregate block level command; and
executing the aggregate block level command by at least:
providing web service application programming interface calls to a web service to cause an object-based virtual data storage system accessible via the web service to persistently store data blocks in data objects in accordance with each block-level command of the obtained plurality of block-level commands, wherein each block-level command of the block-level commands comprises updated data for a data block that has a data block address, the data block having data corresponding to the data block address stored in another data object as a result of a previous block-level command specifying the data block address;
causing a data storage device to store data blocks in accordance with each block-level command of the obtained plurality of block-level commands, the data storage device separate from the virtual data storage system; and
updating a key-value data store, separate from the object-based virtual data storage system, in accordance with the block-level commands, the key-value data store being separate from the object-based virtual data storage system.

15. The system of claim 14, wherein:
the object-based virtual data storage system is a key-value store that associates data objects with respective keys; and
the instructions further cause the system to maintain a map that associates data block addresses with keys of the key-value store.

16. The system of claim 14, wherein the block-level commands are small computer system interface commands.

17. The system of claim 14, wherein a call of the web service application programming interface calls refers to a data object stored in the object-based virtual data storage system using a uniform resource locator.

18. The system of claim 14, wherein persistently storing data blocks in data objects includes, for each data object of at least a subset of the data objects, storing multiple data blocks in the data object.

19. The system of claim 14, wherein the instructions further cause the system to imitate block-level storage devices for multiple entities.

20. A non-transitory computer-readable storage media having stored therein instructions that, as a result of execution by one or more processors of a computer system, cause the computer system to:
obtain a write command that specifies a data block and data for the data block;
aggregate the write command and a different write command specifying different data into an aggregated write command;
execute the aggregated write command by at least:
providing a web service application programming interface call to a web service to cause the data for the data block to be persistently stored in a virtual data storage system that stores a data object, the data object being a logical container for one or more data blocks; and
providing the data according to the write command to a data block storage system, the data block storage system different from the virtual data storage system; and
aggregate the data for the write command and the different write command into the data object, wherein the write command and the different write command comprise updated data for a data block having a data block address, the data block having data corresponding to the data block address stored in another data object as a result of a previous write command specifying the data block address; and
maintain, in a data store separate from the virtual data storage system, information usable to locate the data object from an identifier of the data block.

21. The non-transitory computer-readable storage media of claim 20, wherein the write command is configured according to a small computer system interface protocol.

22. The non-transitory computer-readable storage media of claim 20, wherein:
the data storage system is a key-value store; and
the information associates a block identifier for the data block with a key usable to retrieve the data object from the data storage system.

23. The non-transitory computer-readable storage media of claim 20, wherein the data object contains at least one data block additional to the data block.

24. The non-transitory computer-readable storage media of claim 20, wherein the instructions, when executed by the one or more processors, further cause the system to:
obtain a read command that specifies the data block; and
provide, in response to the read command, the data block by obtaining the data block from the data object.

25. The non-transitory computer-readable storage media of claim 20, wherein:
the data block is of a logical unit addressable by a small computer system interface protocol; and
the command is obtained with information that enables the system to distinguish the logical unit from among multiple logical units.

* * * * *